US005611710A

United States Patent [19]

Essrich

[11] Patent Number: 5,611,710

[45] Date of Patent: Mar. 18, 1997

[54] MULTI-POLE PLUG INSERT

[75] Inventor: Wolfgang Essrich, Hilden, Germany

[73] Assignee: HTS Elektrotechnik GmbH, Neunkirchen-Seelscheid, Germany

[21] Appl. No.: 318,829

[22] PCT Filed: Feb. 12, 1994

[86] PCT No.: PCT/EP94/00404

§ 371 Date: Feb. 23, 1995

§ 102(e) Date: Feb. 23, 1995

[87] PCT Pub. No.: WO94/18725

PCT Pub. Date: Aug. 18, 1994

[30] Foreign Application Priority Data

Feb. 13, 1993 [DE] Germany ............................ 9302091 U

[51] Int. Cl.$^6$ .................................................... H02R 31/08

[52] U.S. Cl. ............................................ 439/513; 439/709

[58] Field of Search ................................ 439/43, 49, 507, 439/509, 512, 513, 510, 189, 709, 712, 713, 715, 717, 721, 723, 724

[56] References Cited

U.S. PATENT DOCUMENTS

| | | | |
|---|---|---|---|
| 2,911,615 | 11/1959 | Popejoy | 439/713 |
| 3,140,139 | 7/1964 | Urban | 439/686 |
| 3,233,209 | 2/1966 | Lazar et al. | 439/724 |
| 3,246,208 | 4/1966 | Lex, Jr. et al. | 439/43 |
| 4,898,549 | 2/1990 | Nakama et al. | 439/715 |
| 5,266,043 | 11/1993 | Giroux et al. | 439/43 |

FOREIGN PATENT DOCUMENTS

| | | |
|---|---|---|
| 3522797 | 11/1986 | Germany . |
| 973983 | 12/1962 | United Kingdom . |

*Primary Examiner*—Gary F. Paumen
*Assistant Examiner*—T. C. Patel
*Attorney, Agent, or Firm*—Harness, Dickey & Pierce, P.L.C.

[57] ABSTRACT

A multi-plug insert has a first part which provides a first number of contact inserts. A second part includes a second multiple number of connecting contacts relative to the first number. Each contact insert in the first part is permanently conductively connected to the multiple number of connecting contacts in the second part. The second part, between each two adjoining sets of multiple members of connecting contacts each permanently conductively connected to a contact insert in the first part is provided with an aperture into which it is possible to clamp a contact bridge. The contact bridge establishes a conducting connection between the two adjoining sets of multiple number of connecting contacts with all the connecting contacts remaining accessible.

23 Claims, 12 Drawing Sheets

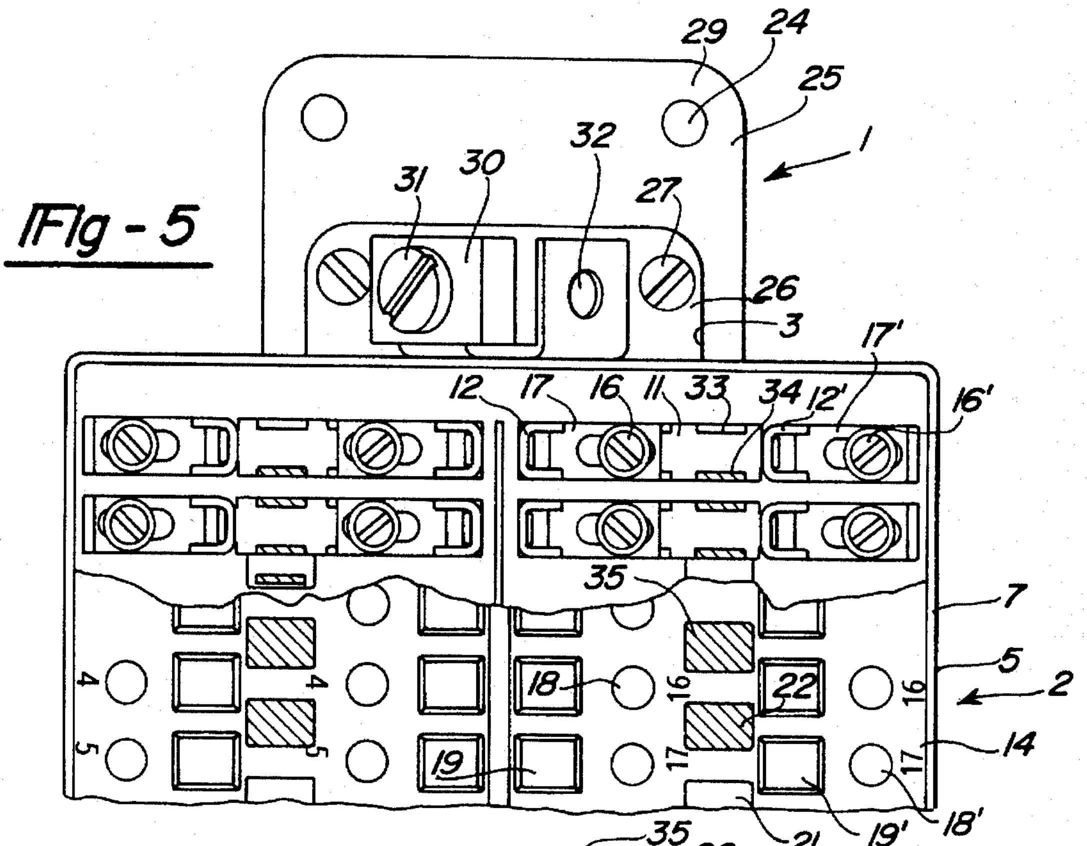
IFig - 5
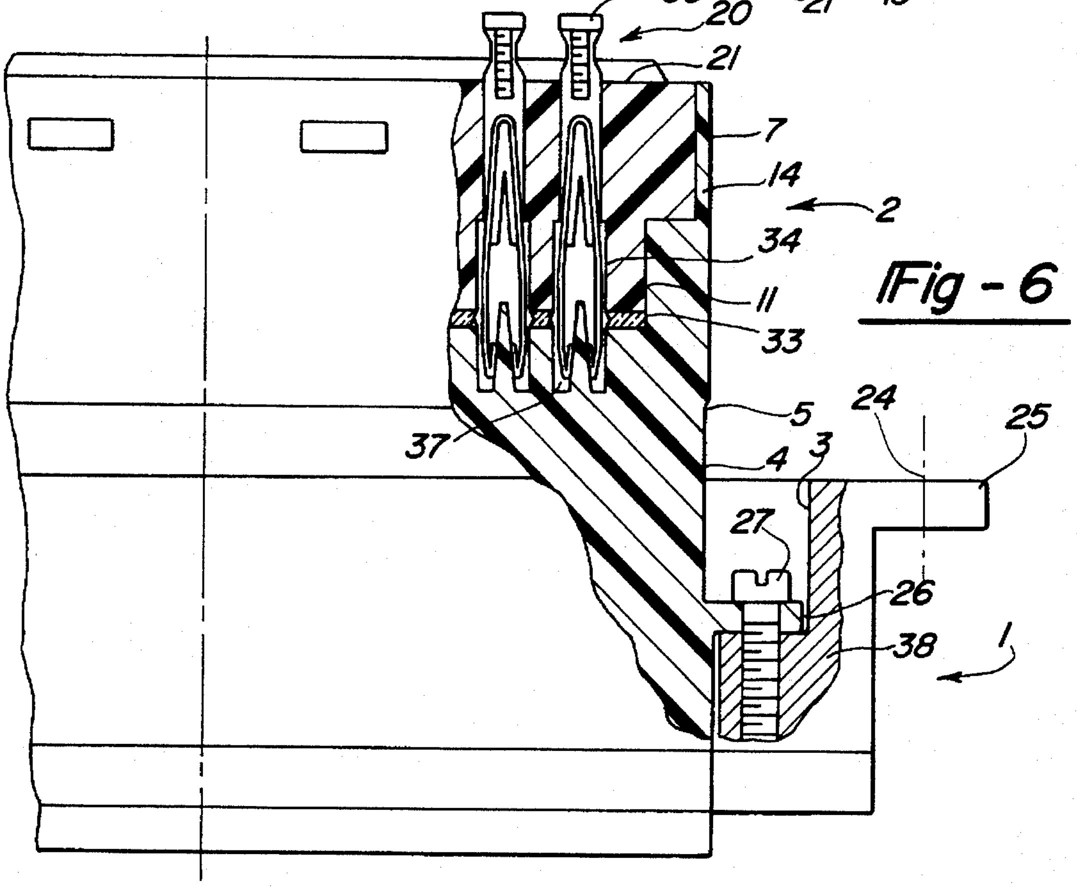
IFig - 6

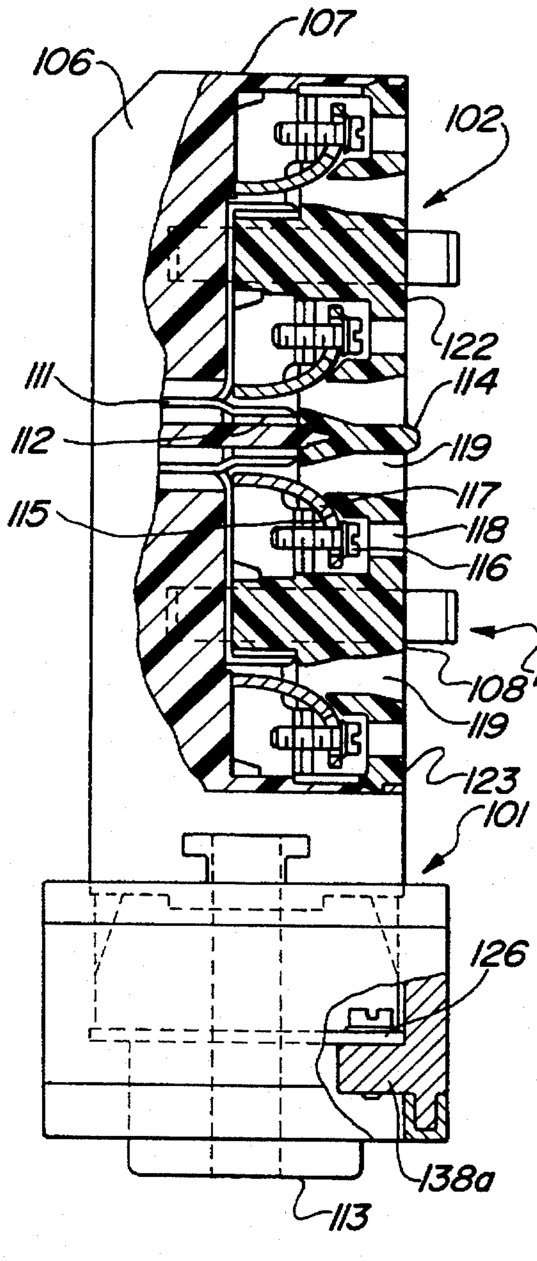
IFig - 13A
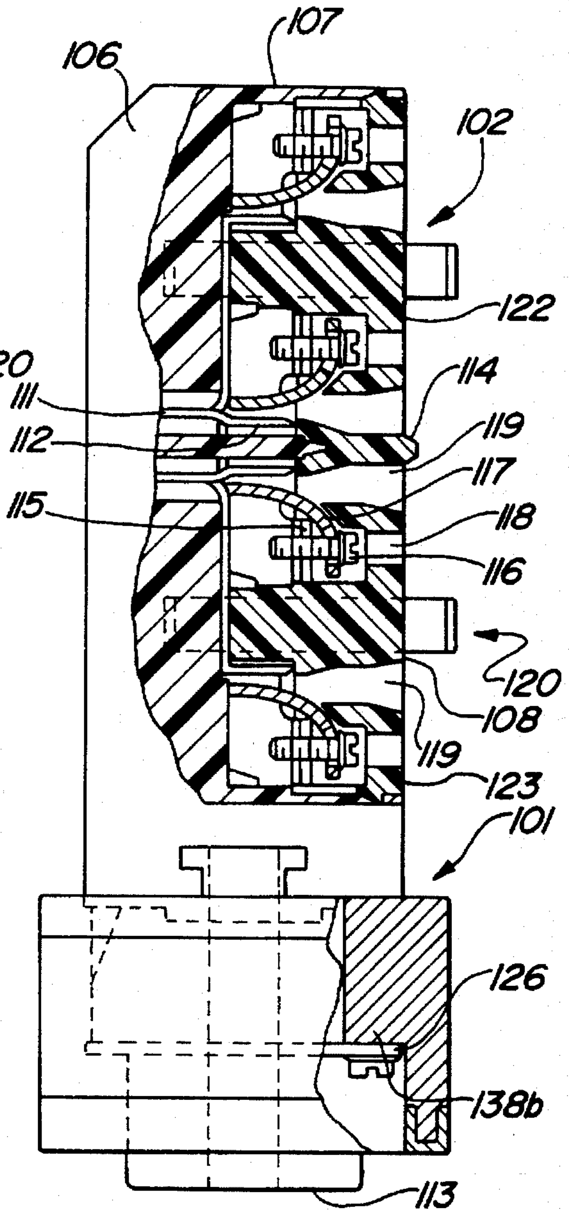
IFig - 13B

MULTI-POLE PLUG INSERT

DESCRIPTION

The invention relates to a multi-pole plug insert, for example for being fitted in a plug housing comprising a through-aperture for accommodating the plug insert and a flange face for fixing the plug housing to a base plate or to the wall of a switch cabinet, or for being directly attached to holding devices or walls of switch cabinets or the like.

Plug inserts of the above-mentioned type are frequently used for industrial control and regulation purposes. Frequently, a plurality of such plug inserts is arranged in parallel in switch cabinets. The respective plug insert or the respective attachable housing are inserted into the switch cabinet in such a way that plug-in contacts—pins or bushes—to be connected to a counter plug point outwardly, whereas the required wiring is connected on the inside by means of suitable connecting contacts. The connecting contacts may be provided in the form of screwed contacts, flat plug-in contacts, crimped contacts, spring-loaded clamping contacts, soldered contacts or in the form of termi-points (connection for terminal) or wire rap (connection for winding-technical applications).

In such cases, it is frequently necessary to connect a contact pin or contact bush several times, i.e. it becomes necessary to provide multiple wiring for each contact pin or contact bush. It is highly unpractical to achieve this with one single connecting contact, and in the case of soldered connections, this is virtually impossible. In addition, according to VDE and the regulations of the German Federal Railway this is not permitted and industry, substantially, is subject to relevant works standards; at least such connections are not used in practice. Only with soldered connections, in the case of control currents, but not operating currents, double connections of a connecting contact may be made provided the connecting wires were previously provided with soldering lugs.

It is therefore the object of the present invention to provide a plug insert of the initially mentioned type which permits variable multiple connection of each contact pin or contact bush without complicating the connecting operation or adversely affecting operational safety.

The objective is achieved in that the plug insert comprises a first part provided with a first number of contact inserts and a second part provided with a second multiple number of connecting contacts relative to the first number, with each contact insert in the first part being permanently conductingly connected to two connecting contacts in the second part and with the second part, between each two adjoining pairs of connecting contacts each permanently conductingly connected to a contact insert in the first part, being provided with an aperture into which it is possible to clamp a contact bridge which establishes a conducting connection between the two adjoining pairs of connecting contacts.

In an advantageous embodiment, each plug-in contact in the first part is permanently conductingly connected to just two connecting contacts in the second part. This is the most frequently occurring application, so that, hereafter, reference will be made to this application only. It is also possible to deviate from this embodiment in that each plug-in contact in the first part is permanently conductingly connected to a larger number, e.g. four connecting contacts in the second part, if there is a need for such an application. In accordance with the invention, it is also possible, optionally, to produce conductor connections between a larger number of connecting contacts by means of suitable contact bridges. Contact bridges of this type will be described at a later stage.

In an advantageous embodiment, the first part comprises two parallel rows of plug-in contacts and the second part four parallel rows of connecting contacts, each row having the same number of contacts. This arrangement, primarily, concerns attachable housings for 6-, 10-, 16-, or 24-pole plugs. However, the concept of the invention is also applicable to those plugs which, for example, comprise only one row of plug-in contacts in the region of the first part and a plurality of, especially two, rows of connecting contacts in the second part.

The plug insert in accordance with the invention consists in that, in the second part, between each two pairs of permanently conductingly connected connecting contacts, there is provided an aperture into which it is possible to clamp a contact bridge which establishes a conducting connection between the two adjoining pairs of connecting contacts which are permanently conductingly connected to one another.

Instead of spring-loaded contact bridges which cooperate with fixed contact edges at the conductors it is also possible to use non-resilient contact pins which cooperate with resilient contact edges of the conductors.

In this way, it is possible to meet a wide range of requirements by increasing the number of connecting possibilities for a contact pin or a contact bush to 4, 6, 8, etc. in that conductor bridges are produced by the said contact bridges. It should be mentioned, however, that the number of supplementary plug-in contacts to be connected in the counter plug is reduced, i.e. some of the plug-in contacts are located on the same potential.

According to a first embodiment which is advantageous from the point of view of assembly, the plug insert consists of at least two parts and, in the second part, is divided in a main dividing plane perpendicularly to the through-apertures of the plug insert and comprises respective recesses into which it is possible to insert conductor elements which are fixed by assembling the two parts and serve to conductingly connect the plug-in contacts to the respective connecting contacts. The two parts of the second part of the plug insert, which consist of a non-conductive material, may be secured relative to one another by clamped or glued connections.

According to a further embodiment which is advantageous from the point of view of assembly, the plug insert is composed of a plurality of disc members which comprise the first and second part and whose main dividing planes extend parallel to the through-apertures of the plug insert and comprise the respective recesses between which it is possible to insert plug-in contacts and connecting contacts which are conductingly connected to one another and which are then held by assembling two of the disc members. The plurality of disc members consisting of a non-conducting material can be easily connected to one another by means of riveted or bolted connections which extend transversely to the disc planes.

According to a preferred first basic embodiment it is proposed that the face of the second part which is visible in a plan view projects beyond the cross-section of the first part in such a way as to extend perpendicularly relative to the plugging-in direction. In this case, it is particularly advantageous if the first connecting face provided with plug-in apertures for the contact inserts on the one hand and the second connecting faces provided with plug-in apertures for the connecting contacts on the other hand extend parallel relative to one another and point in opposite directions. According to a further advantageous embodiment, the second connecting faces are co-planar.

According to a further advantageous embodiment, the first contact face provided with plug-in apertures for the contact insert on the one hand and the second connecting faces provided with plug-in apertures for the connecting contacts on the other hand jointly form an angle. The installation conditions permit the second connecting faces of be offset in parallel relative to one another or for the second connecting faces to be positioned roof-like relative to one another and symmetrically relative to the first connecting face.

In the case of a plug insert of the said type for being arranged in a plug housing with a through-aperture for receiving a plug insert it is more advantageous if the first part is insertable into the inner cross-section of the through-aperture and if the second part adjoins the first part outside the through-aperture and projects beyond the inner cross-section of the through-aperture.

The first part of such a plug insert is inserted into a conventional plug housing, especially an attachable housing, so that in this respect the surroundings of the plug insert do not have to be adapted in any special way. The first part of the plug insert may, in a way known in itself, be provided with contact pins or contact bushes. Because the second part of the plug insert is designed in accordance with the invention it is possible for each contact pin or contact bush to be separately connected to a plurality of connecting wires. Because the second part of the plug insert has been widened, the respective connecting contacts have conventional dimensions and especially, they are spaced in the usual way, thereby permitting easy access.

In view of the conventional oblong rectangular shape of the plug inserts and the associated attachable housings it is proposed according to an advantageous embodiment that the first and the second part of the plug insert are substantially of the same length so that the second part, in respect of its width, laterally projects beyond the attachable housing. Therefore, if several attachable housings for the plug inserts in accordance with the invention are arranged in a switch cabinet housing, the lateral distance between them has to be increased, but they may be arranged in several rows of this type, with the conventional distance between their ends remaining unchanged.

Because of the shape of the plug insert in accordance with the invention, it has to be inserted from behind into a matching standard attachable housing. Equally, the plug insert is preferably bolted to the attachable housing from behind, with reference to same. In consequence, the wires are preferably connected to the separate plug insert which is subsequently inserted from the wiring end into the attachable housing which, optionally may already be fitted in the switch cabinet.

In an advantageous alternative basic embodiment, the cross-section of the second part, in the direction of the plug-in apertures thereof, approximately corresponds to the cross-section of the first part, i.e. perpendicularly to the plug-in apertures thereof.

In an advantageous embodiment thereof, the first connecting face of the first part provided with the apertures for the plug-in contacts forms an angle with the second connecting faces provided with the connecting apertures for the connecting contacts, and it is possible for the first connecting face on the one hand and the second connecting faces on the other hand, together, to form an angle of 90°, with the connecting faces being co-planar relative to one another or that the first connecting face on the one hand and the second connecting faces on the other hand, together, form an angle ranging between 90° and 180°.

In the case of a plug insert of the above-mentioned type for fitting in a plug housing with a through-aperture for receiving the plug insert it is advantageously proposed that the first part is insertable into the inner cross-section of the through-aperture and that, outside the through-aperture, the second part follows with a cross-section passing through said through-aperture.

Because of their shape, the above-mentioned plug inserts may optionally be inserted into the attachable housing either from the front or from the back. To allow the respective fixing flanges, if necessary, to be guided past the bases in the attachable housing, they must be able to carry out a slight tilting movement. However, according to a preferred embodiment it is proposed that when introducing the plug inserts from the front, the fixing flanges, also in front, rest on bases set back in the attachable housing, whereas when inserting the plug inserts from the back, the fixing flanges, in the back, rest on bases arranged in a conventional way in the attachable housing. However, irrespective of the above, bolting may optionally be effected either from the front or from the back depending on whether the bases are provided with a through-hole and the reinforced bolted flanges with a threaded hole or vice versa.

Apart from the method of fixing the plug inserts in the attachable housings, as described in detail above, it is also possible to screw them indirectly into metal plates with suitable assembly apertures whose cross-section corresponds to the inner cross-section of the attachable housing. Furthermore, it is also possible to attach the plug inserts on individual parallel carrier rails; when fixing a plurality of plug inserts, only the distances between the fixing holes on the carrier rails have to be selected accordingly.

Preferred embodiments are described in the subclaims.

Below, the invention is explained in greater detail with reference to the drawings wherein FIG. 1 is a vertical section of a first embodiment of a plug insert in accordance with the invention, fitted in an attachable housing.

FIG. 13 shows a vertical section of a third embodiment of a plug insert in accordance with the invention, fitted in an attachable housing, a) in a conventional attachable housing, b) in an attachable housing with a set-back base, for reverse assembly purposes.

FIG. 23 is a side view of a sixth embodiment of a plug insert in accordance with the invention, fitted in an attachable housing, with second connecting faces which are inclined roof-like.

Below, FIGS. 1 and 4, 2 and 5 and 3 and 6 will be described jointly. The majority of reference numbers used is given only in the enlarged FIGS. 4, 5 and 6.

Figure 1:
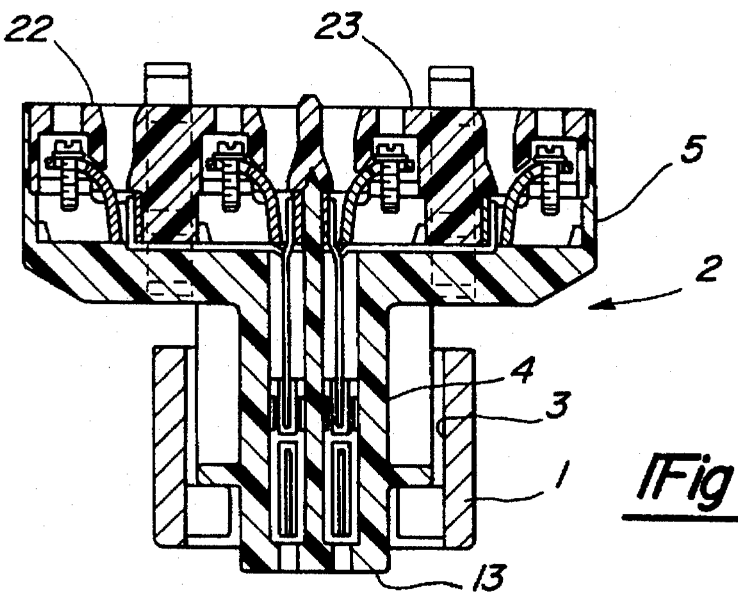
Figure 4:
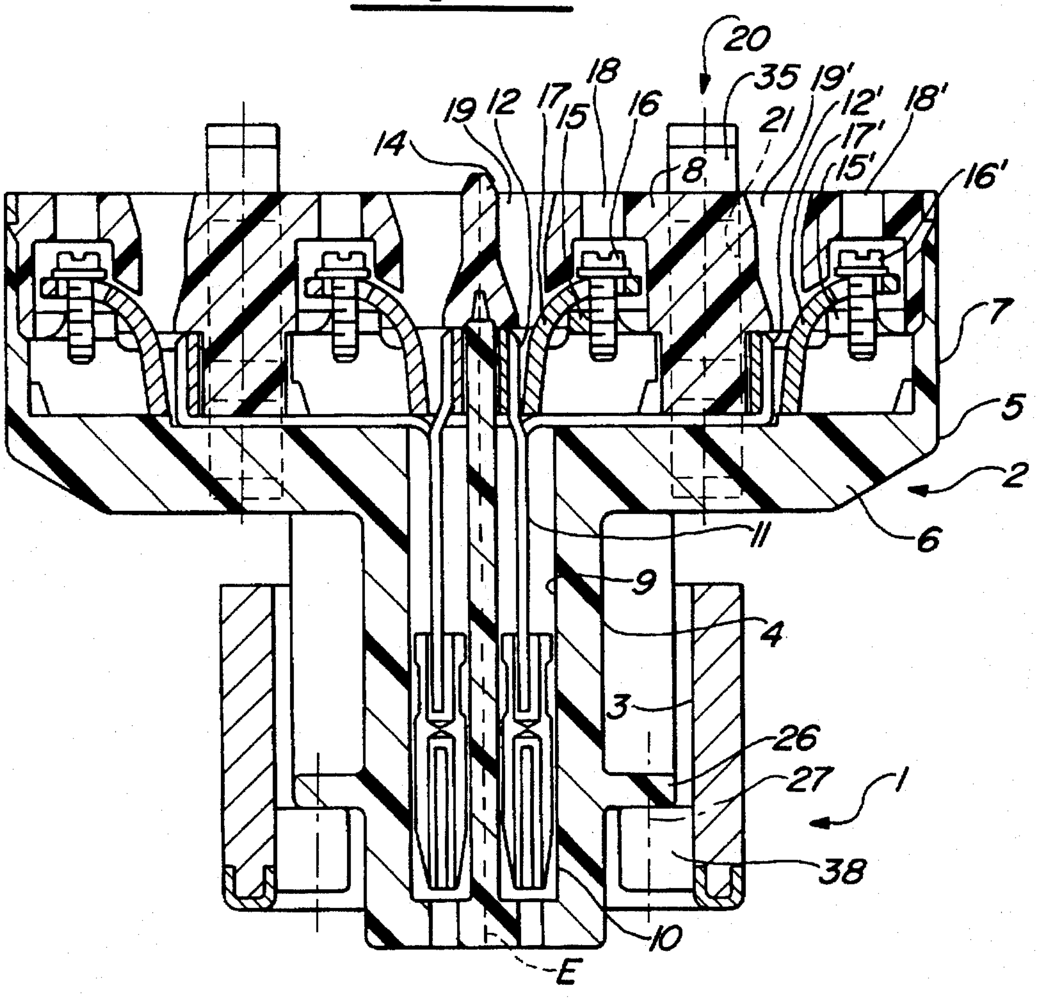
FIG. 4 is an illustration according to FIG. 1, the size being twice the actual size.

FIGS. 1 and 4 show a cross-section through a conventional attachable housing 1 and a plug insert 2 in accordance with the invention inserted into said housing. The plug insert 2 comprises fixing flanges 26 which rest on bases 38 in the attachable housing 1 and are connected thereto by screws 27 indicated by centre lines only. The plug insert 2 comprises a first part 4 inserted into the through-aperture 3 of the attachable housing 1 and a second part 5 positioned outside same and projecting beyond the open cross-section of the attachable housing 1. The first part 4 is integral with a base plate 6 of the second part 5. The base plate 6 comprises a lateral frame part 7, with inserts 8 being inserted into said frame part. The first part 4 comprises pairs of plug-in apertures 9, with contact bushes 10 being slid into said plug-in apertures and being in contact with conductor rails 11 which, towards their rear ends, are divided into first contact tongues 12 and second contact tongues 12'. The conductor rails 11 are held between the base plate 6 and the inserts 8. These may be clamped to one another. The parts mentioned so far are each arranged symmetrically relative to a central plane E, with two halves of the first part 4 of the base plate 6 being centrally glued to one another. In the frame part 7 of the second part 5, a cover part 14 provided with multiple apertures and designed in one piece is positioned on the inserts 8. Said cover part 14 holds four units of connecting contacts, each consisting of a holding plate 15, 15', a clamping screw 16, 16' screwed into said plate, and a movable clamping plate 17, 17'. When tightening the clamping screw 16, 16', the clamping plate 17, 17' rests against one of the contact tongues 12, 12' so that, in this region, a conductor may be clamped in. The cover part 14 is provided with screw apertures 18, 18' for adjusting the clamping screws and with plug-in apertures 19, 19' for inserting conductor wires. It is also possible to identify contact bridges 20 whose shape and function will be explained with reference to the further Figures. The plug insert 2 of the type shown here comprises a first connecting face 13 with apertures 9 for the contact inserts, and two connecting face parts 22, 23 which are arranged parallel relative to said first connecting face and in a co-planar and symmetric way relative to one another, with plug-in apertures 19 for the connecting contacts, with the first contact face 13 and the second connecting faces 22, 23 extending in opposite direction relative to one another.

Figure 2:
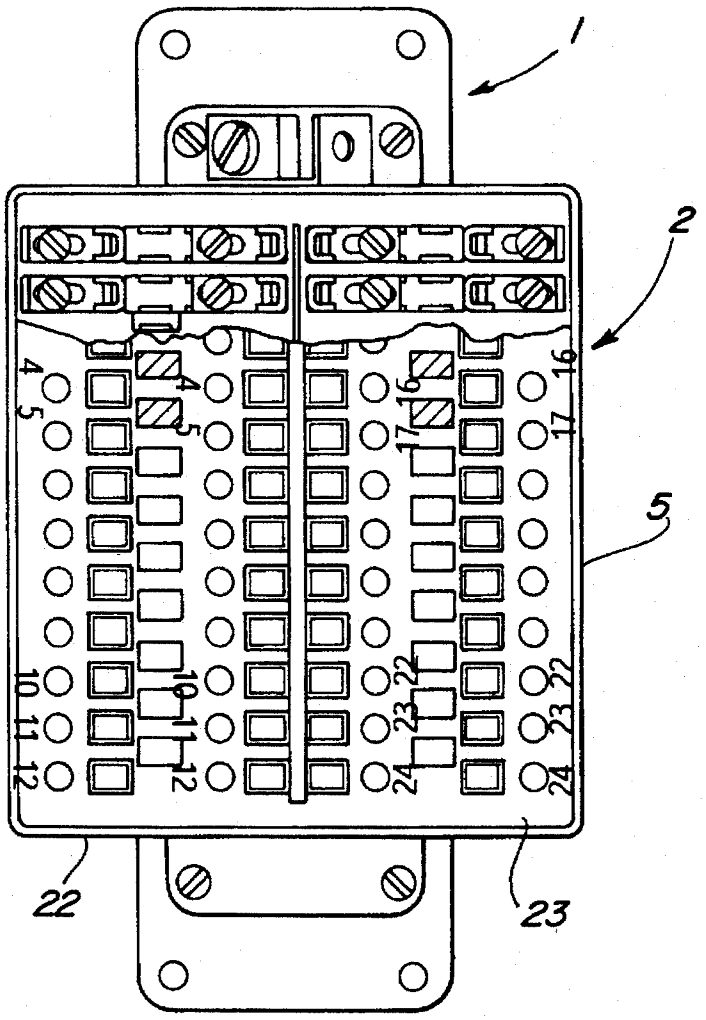
FIG. 2 shows a plug insert with an attachable housing according to FIG. 1, with a plan view of the second part.
Figure 5:
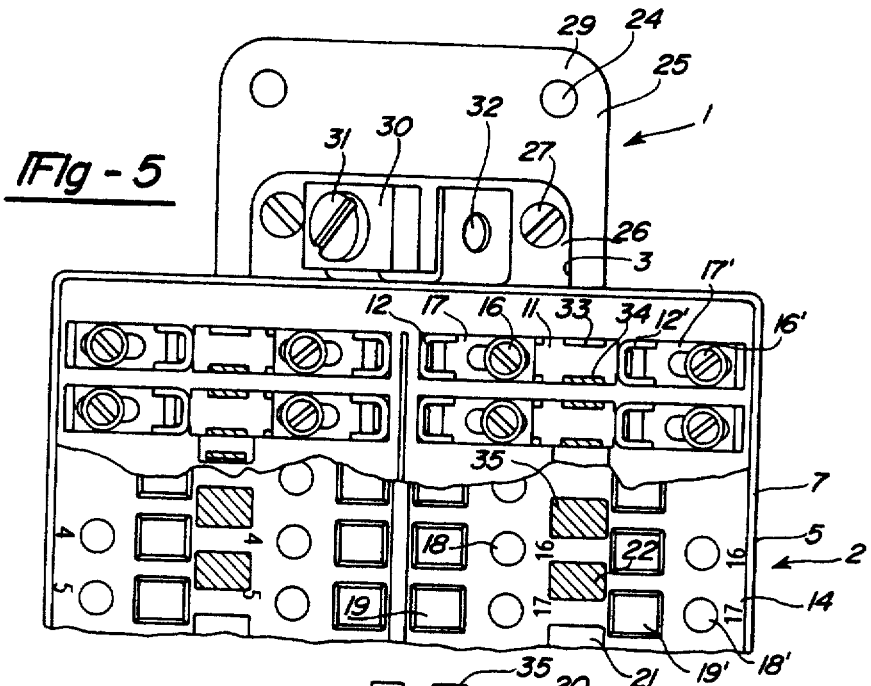
FIG. 5 shows a detail according to FIG. 2, enlarged to twice the actual size.

In FIGS. 2 and 5, any details corresponding to those shown in FIGS. 1 and 4 have been given the same reference numbers. The majority of reference numbers is shown in the enlarged illustration of FIG. 5 only. The plan view refers to the attachable housing 1 whose ends comprise flanges 25 with through-holes 24 for inserting screws for fixing the housing to a switch cabinet housing or the like. In the through-aperture 3 of the attachable housing 1, fixing flanges 26, by means of screws 27, are screwed into the base 38. At the end faces of the plug insert 2, there are secured plate metal parts forming clips 28, 29 one of which is provided with a holding plate 30 and a clamping screw 31 whereas the other one is provided with a threaded hole 32 only. Earthing or protective contact wires may be clamped to said clips. The plug insert 2 of which the second part 5 is visible is partially shown in a plan view, with part of the cover part 14 being broken away. The continuous frame part 7 is shown in its entirety.

Underneath the broken-away region it is possible to see parallel conductor rails 11 which are divided into contact clips 12, 12', with clamping plates 17, 17' and clamping screws 16, 16' being associated therewith. The contact rails each comprise contact edges 33 which are laterally broken out and which may be engaged by contact bridges 20 which, when inserted, generate a conducting contact between two parallel adjoining conductor rails 11. The contact bridges 20 comprise parallel resilient conductor arms 34. Four of said contact bridges are shown in section in the above-mentioned broken-away illustration.

The plan view shows the apertures 18, 18' for the clamping screws and the apertures 19, 19' for inserting the conductor wires. Between each two rows of said apertures there are arranged further apertures 21 into which the above-mentioned contact bridges 20 may be slid. The plan view shows four contact bridges 20 with their upper gripping parts 35.

Figure 3:
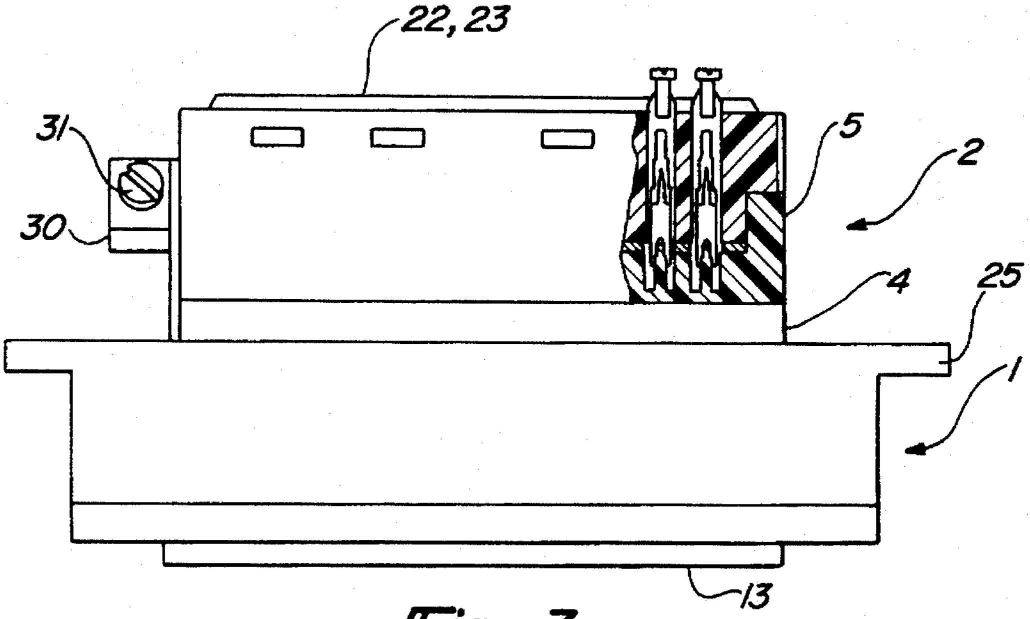
FIG. 3 is a side view of a plug insert with an attachable housing according to FIG. 1.
Figure 6:
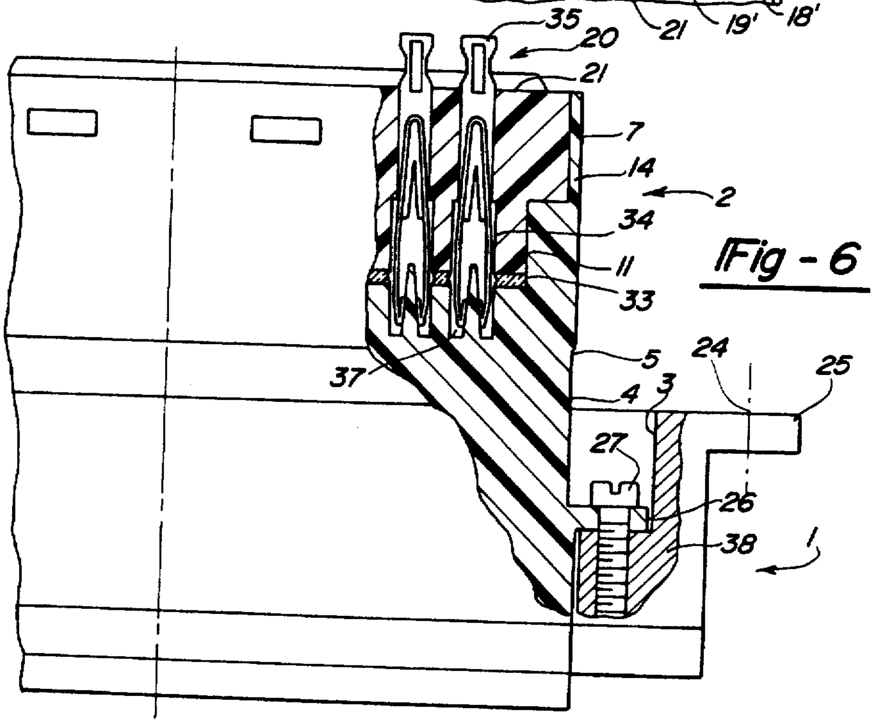
FIG. 6 shows a detail according to FIG. 3, again enlarged to twice the actual size.

In FIGS. 3 and 6, any details corresponding to those of the previous Figures have been given the same reference numbers. Most of the details are shown in the enlarged illustration of FIG. 6 only. FIGS. 3 and 6 show the attachable housing 1 with fixing flanges 25 and through-hole 24, with the plug insert 2 inserted into said housing as explained with reference to the previous Figures. The first part 4 of the plug insert 2 is inserted into the through-aperture 3 of the attachable housing 1 and projects from the bottom end thereof. The upper wider second part 5 is partially shown in section. The through-aperture 3 comprises a central axis A. The holding plate 30 and the clamping screw 31 are shown on the lefthand side of FIG. 3. The cross-section shows the second part 5 with the frame 7 into which the cover part 14 is inserted so as to fit accurately. The conductor rails 11 provided with laterally broken-away contact edges 33 are inserted and held between the base plate 6 of the second part 5 and the cover part 14. The above-mentioned apertures 21 arranged centrally between two conductor rails 11 extend through the entire cover part 14 and continue in the base plate 6; they contain the contact bridges 20 comprising a non-conducting gripping part 35 and two resilient conductor arms 34 which are conductingly connected to one another in a U-shaped way and cast into the gripping part 35. While being inserted, the free conductor arms 34 stop against a wedge 37 in the base plate 6, which ensures that the arms 34 establish a conducting contact with the contact edges 33 of two parallel conductor rails 11. In this way it is possible to establish a conducting contact between a contact terminal or a contact pin and four connecting contacts or, for example, six connecting contacts if, as in the present case, two contact bridges 20 are inserted.

Figure 7:
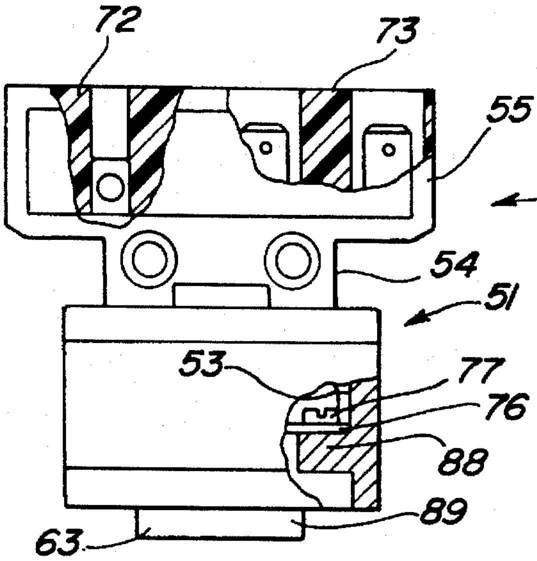
FIG. 7 shows an end view of a second embodiment of a plug insert in accordance with the invention, fitted in an attachable housing, with partial sections.

Below, FIGS. 7 and 10 and FIGS. 8 and 11 will be described jointly. Some of the reference numbers will be given only in the one or the other of the jointly described Figures. FIG. 7 corresponds to a section along line A-B of FIG. 8, FIG. 10 corresponds to a section along line C-D of FIG. 11, and FIG. 12 corresponds to a section along line A-B of FIG. 11.

Figure 10:
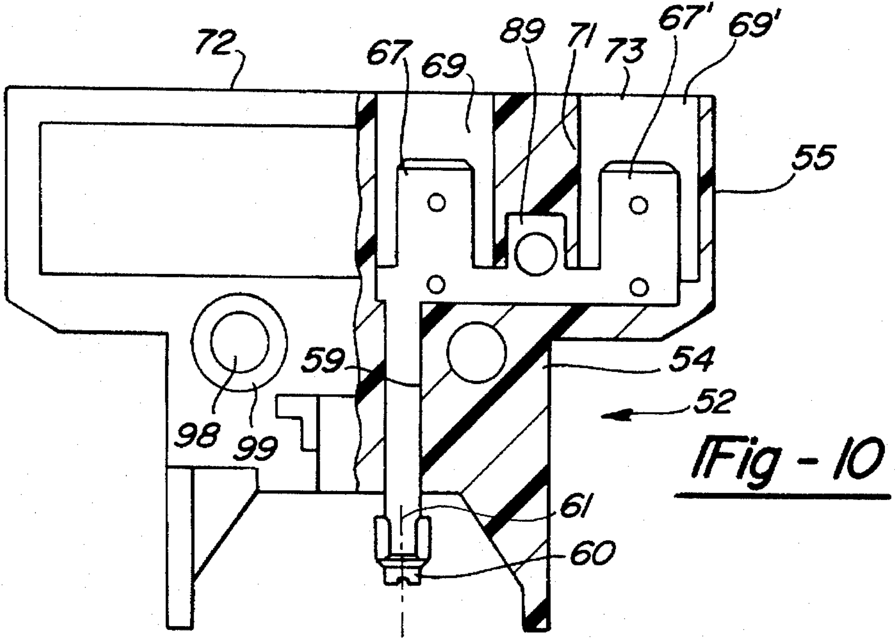
FIG. 10 is half a section of part of the plug insert according to FIG. 7, enlarged to twice the actual size.

In FIGS. 7 and 10, a plug insert 52 is inserted partially (FIG. 10) and completely (FIG. 7) into a conventional attachable housing 51. The plug insert 52 comprises fixing flanges 76 which rest on bases 88 in the attachable housing 51 and are connected thereto by screws 77. The plug insert 52 comprises a first part 54 inserted into the through-aperture 53 of the attachable housing 51, and a second part 55 positioned outside the attachable housing 51 and projecting beyond the open cross-section of same. The lower portion of the first part is formed by a contact insert 89 which is not shown in FIG. 10. In the sectional plane shown in FIG. 10, the first part 54 passes into the second part 55 so as to be integral therewith. The plug insert 52 is provided with longitudinal recesses 59 accommodating conductor rails 61, with plug-in contacts 60 being slid on to the lower ends thereof and crimped thereto. The conductor rails 61 change into connecting contacts 67, 67' so as to be integral therewith. They also comprise central contact tongues 62. The conductor rails 61 are punched out of a metal plate. The connecting contacts 67, 67' end in open plug-in apertures 69, 69' for matching flat plugs. The contact tongues 83 are positioned in the region of plug-in apertures 71 for contact bridges to be shown later. The plug insert 52 is provided with longitudinal bores 98 suitable for passing through rivets 99 for connecting a plurality of disc-shaped parts of the plug insert. The plug insert 52 of the type illustrated here comprises a connecting face 63 with apertures 59 for the contact inserts and two connecting face parts 72, 73 which are arranged parallel thereto and which are co-planar and symmetric relative to one another, as well as the plug-in apertures 69 for connecting contacts, with the connecting face 63 and the connecting faces 72, 73 extending in opposite directions relative to one another.

Figure 8:
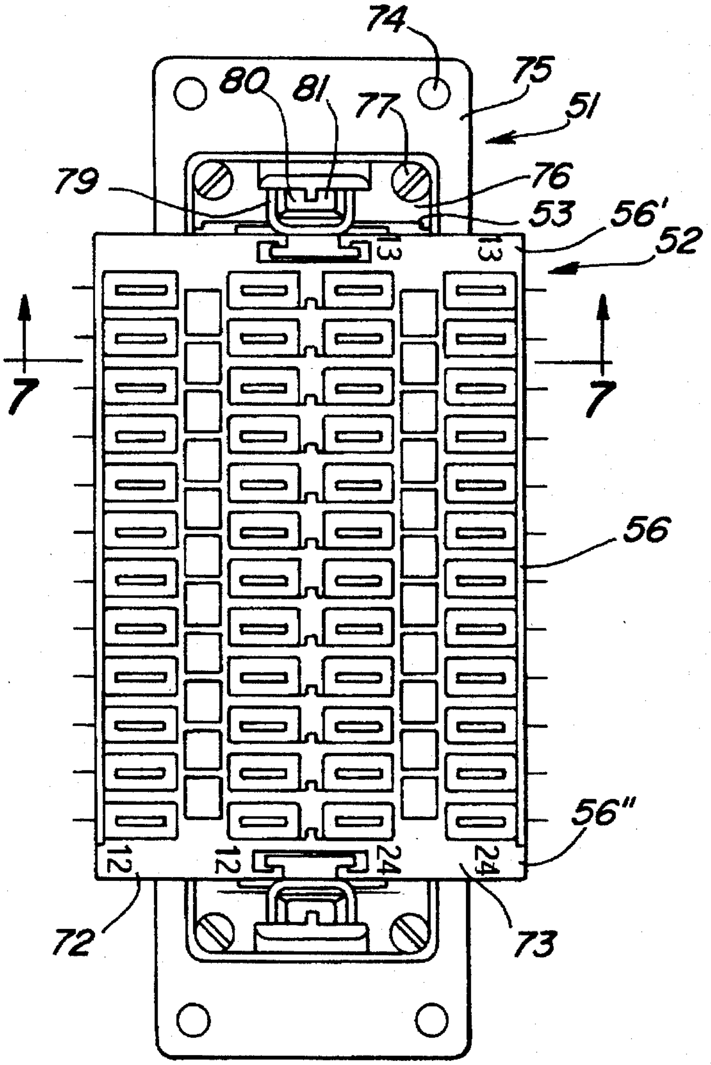
FIG. 8 shows a plug insert with an attachable housing according to FIG. 7, with a plan view of the second part.
Figure 11:
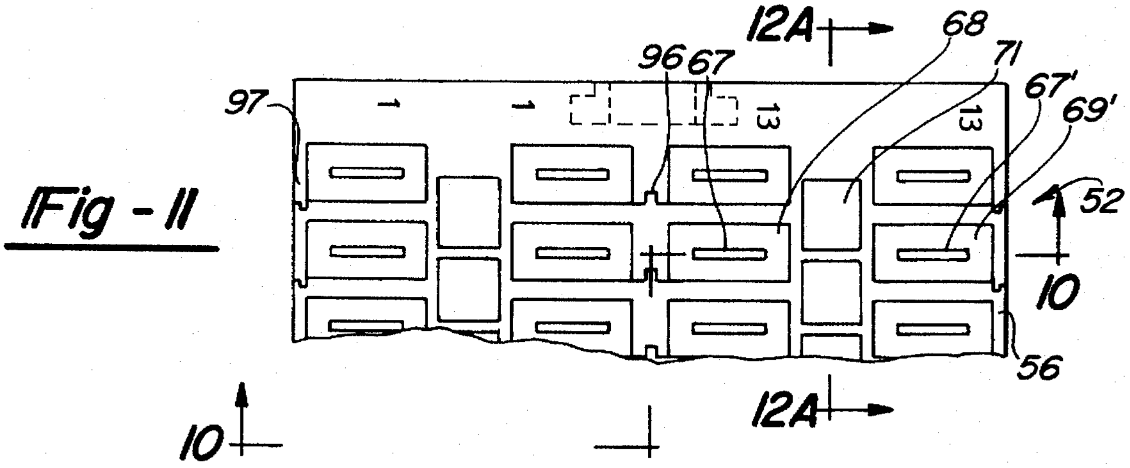
FIG. 11 shows a detail according to FIG. 8, enlarged to twice the actual size.
Figure 12A:
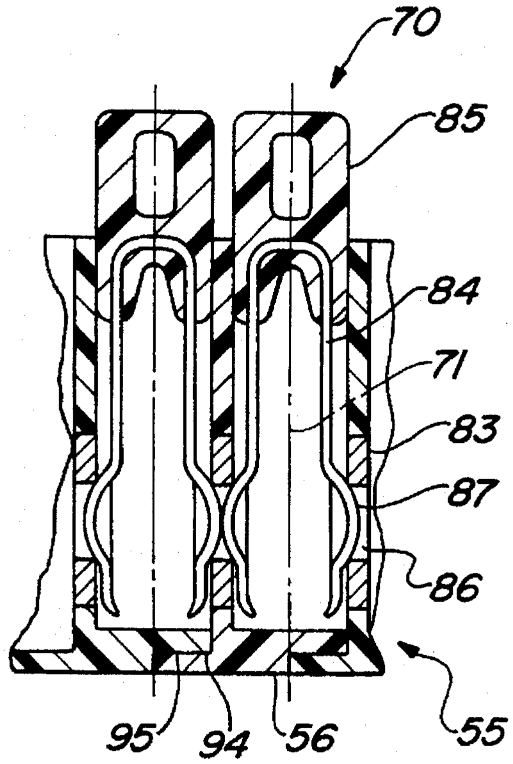
FIG. 12 shows an embodiment of contact bridges a) in the form of a longitudinal section, fitted in a plug insert b) in the form of a detail in a longitudinal section and a side view.
Figure 12B:
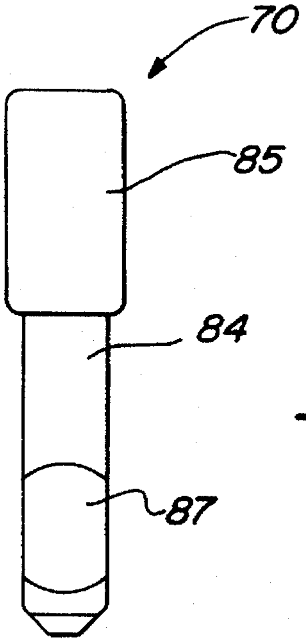

Any details of FIGS. 8 and 11 corresponding to those of FIGS. 7 and 10 have been given the same reference numbers. The plug insert 52 is shown in a plan view, with FIG. 11 showing the attachable housing 51 into which the plug insert 52 is inserted. The ends of the attachable housing 51 are provided with flanges 75 with through-holes 74 for inserting screws by means of which the attachable housing 51 may be screwed to the switch cabinet or the like. In the through-apertures 53 of the attachable housing 51, fixing flanges 76 of the plug insert 52 are screwed by means of screws 77 to the above-mentioned bases 88 of the attachable housing. The end faces of the plug insert 52 are provided with plate metal clips 79, with a holding plate 80 being pressed thereagainst by a screw 81. Earthing or protective contact wires may be clamped on between said parts. FIG. 11 shows that the plug insert is composed of end disc members 56', 56" and further disc members 56 which are identical to one another. It is not incompatible with the designation "disc member" that springs and grooves 96, 97 engage one another in the end faces. Between the disc members it is possible to see the plug-in apertures 69, 69' in which the connecting contacts 67, 67' in the form of tongue-shaped plate metal parts are freely positioned. Commercial flat plugs may be plugged on to said contacts. The plug-in apertures 71 which, at their ends, accommodate the contact tongues 83 are positioned outside the sectional plane illustrated in FIG. 10. When a contact bridge is inserted into one of said apertures 71, adjoining pairs of connecting contacts 67, 67 are conductingly connected to one another in that there is produced a conducting contact between the respective contact tongues 83, for instance the connecting contacts 1-1 are connected to the connecting contacts 2-2 arranged parallel thereto.

Figure 9:
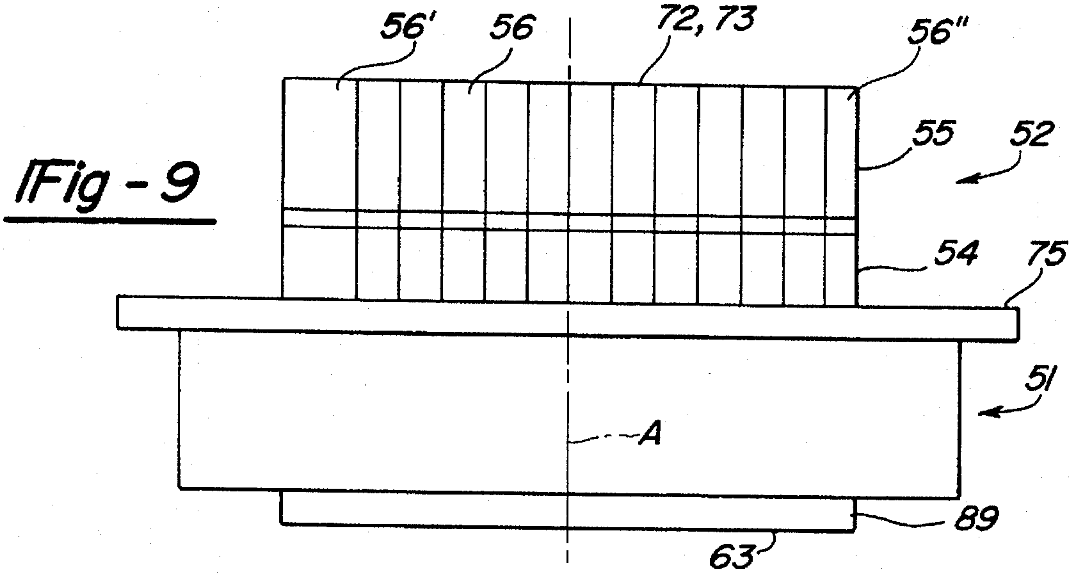
FIG. 9 is a side view of a plug insert with an attachable housing according to FIG. 7.

FIG. 9, without indicating any special details, shows that the plug insert 52 is fitted into the attachable housing 51; the first part 54 projects from the through-aperture and the second part 55 from the upper end thereof. It shows that the plug insert 52, as a whole, consists of disc members 56 which are identical to one another and of two end disc members 56', 56" which comprise the complete height of the first and second parts. The contact insert for contact pins or contact bushes, which projects from the lower end of the through-aperture, is in one piece. The central axis A of the through-aperture is marked especially.

FIG. **12*a* shows a section through the upper part 55 of a plug insert. It also shows the plug-in apertures 71 which are located between individual disc members 56 which, if viewed in a sectional plane, engage one another by means of engaging means 94, 95, a design measure which is not incompatible with the designation "disc member". The contact tongues 83 with apertures 86 are positioned in the ends of the plug-in apertures 71. The apertures 86 are engaged by part of the contact bridges 70 which are shown in the form of a detail in FIG. 12*b* and which comprise a non-conducting gripping part 85 and two resilient conductor arms 84 which are conductingly connected to one another in a U-shaped way and are cast into the gripping part 85. During the plugging-in process, pressed-out portions 87 of the conductor arms 84 engage the apertures 86 of the contact tongues 83. In this way, a conducting contact is produced between two adjoining pairs of connecting contacts 67, 67**.

Below, FIGS. **13*a* and 13*b* will be described jointly. As compared to the details referred to in FIGS. 1 and 4, the reference numbers used have been increased by 100**.

FIGS. 13a and 13b show a cross-section through a conventional attachable housing 101a and 101b respectively and a plug insert 102 in accordance with the invention inserted into said housings. The plug insert 102 comprises screwed-on fixing clips 126 resting on bases 138a and 139b respectively in the housing 101 and are connected thereto by screws 127. The bases 138a according to FIG. 13a are positioned towards the front towards the plug end in the housing 101a, with the fixing clips 126 for fitting and screwing on the plug insert 102 being positioned thereon towards the rear. The bases 139b according to FIG. 13b are set back from the plug end and moved further into the housing 101b. In this case, the plug insert 102 may be fitted and screwed on from the front end. The plug insert 102 comprises a first part 104 inserted into the through-aperture 103 of the attachable housing 101, and a second part 105 positioned outside same and fitting into the open cross-section of the attachable housing 101. The first part 104 passes into a base plate 106 of the second part 105 so as to be integral therewith. The base plate 106 comprises a lateral frame part 107 into which there is fitted a cover part 114. The first part 104 is provided with pairs of apertures (not illustrated) which contain contact bushes which are in contact with conductor rails 111 which are divided into first contact tongues 112 and second contact tongues 112', with only one half of the second part having a reference number. The conductor rails 111 are held between the base plate 106 and the cover part 114. These parts may be clamped together. The parts mentioned so far are arranged symmetrically relative to a central plane E of the second part 105. The cover part 114 inserted into the frame part 107 of the second part is provided with multiple apertures and produced in one piece. It holds four units of connecting contacts each consisting of a holding plate 115, 115', a clamping screw 116, 116' threaded into said plate, and a movable clamping clip 117, 117'. When tightening the clamping screw 116, 116', the clamping clip 117, 117' comes to rest against one of the contact tongues 112, 112' so that a conductor may be clamped into this region. To permit the clamping screws to be adjusted, the cover part 114 is provided with screw apertures 118, 118', with further plug-in apertures 119, 119' being provided for plugging in conductor wires. The type of plug insert 102 illustrated here comprises a first connecting face 113 with apertures for the contact inserts, and two connecting face parts 122, 123 which form an angle of 90° relative to said first contact face and which are co-planar and symmetric relative to one another, with plug-in apertures 119 for connecting contacts. Plug inserts of this type may, optionally, be slid through an attachable housing in their entirety by being tilted laterally.

Figure 14:
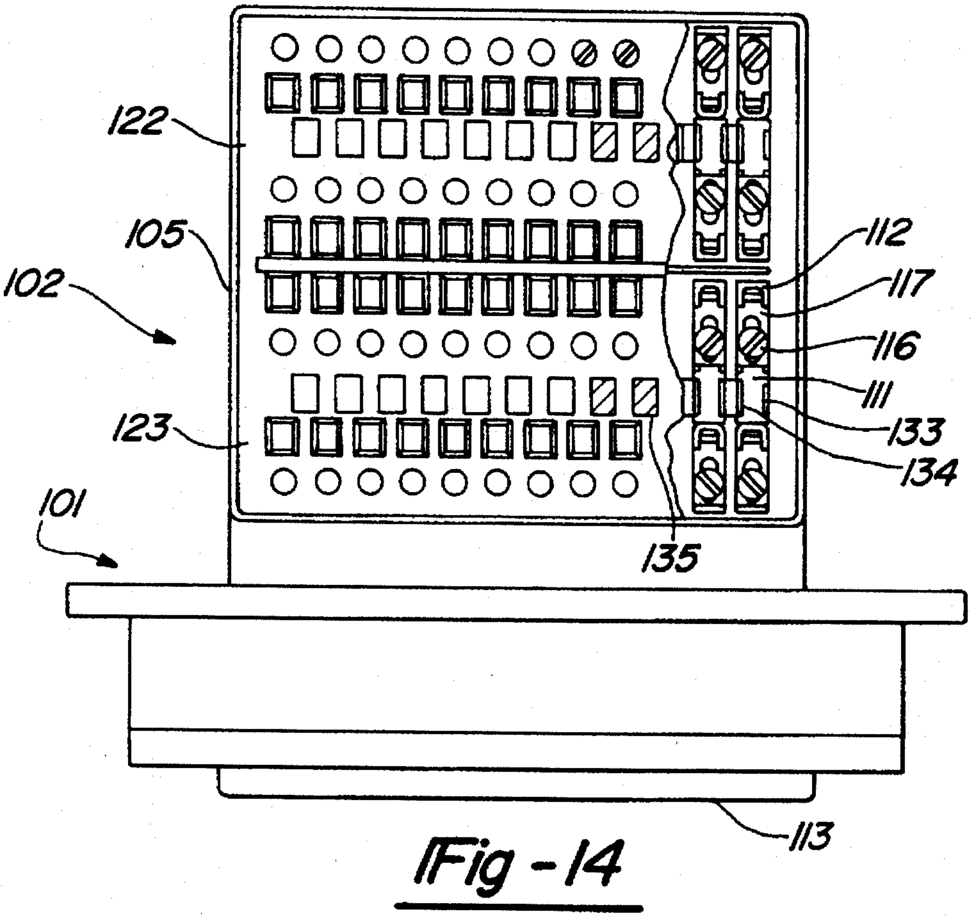
FIG. 14 is a side view of a plug insert with an attachable housing according to FIG. 13, with a plan view of the second connecting faces.

The reference numbers of any details in FIG. 14 corresponding to those shown in FIGS. 2 and 5 are increased by 100. The attachable housing 101 is shown in a side view; at its ends, it comprises flanges 125 for fixing the housing to a switch cabinet housing or the like. The plug insert 102 of which the second part 105 is shown is partially illustrated in a plan view, partly by braking away the cover part 114. The continuous frame part 107 is shown without breaking out any parts.

Underneath the broken-away region, there are visible conductor rails 111 which are divided into contact clips 112, 112', with clamping plates 117, 117' and clamping screws 116, 116' being associated therewith, with only one half of the illustration having reference numbers. The conductor rails are provided with contact edges 113 which are laterally broken away, which may be engaged by contact bridges 120 and which are inserted for producing a conducting contact between two parallel adjoining conductor rails 111. Said contact bridges 120 comprise parallel resilient conductor arms 134. Four such contact bridges are shown in section in a broken-away illustration as mentioned above.

The plan view of the second part shows apertures 118, 118' for the clamping screws and apertures 119, 119' for inserting conductor wires. Between each two rows of said apertures there are arranged further apertures 121 into which it is possible to insert the above-mentioned contact bridges 120. The plan view shows four contact bridges 120 with gripping parts 135 at their upper ends.

Figure 15:
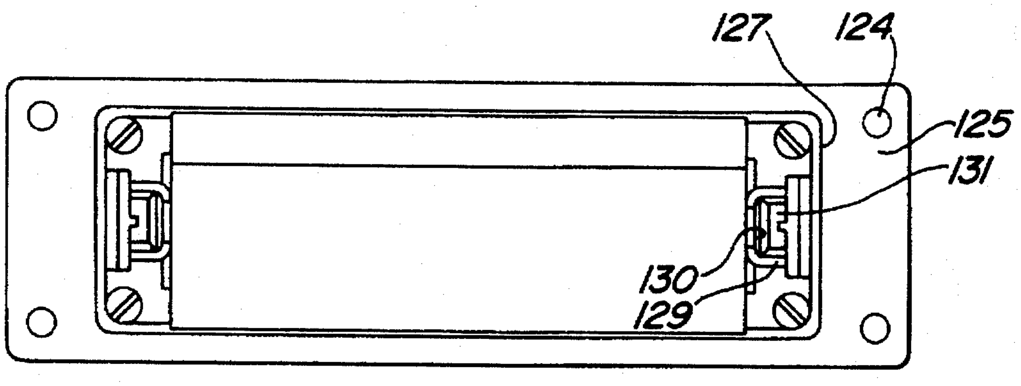
FIG. 15 is a plan view of a plug insert with an attachable housing according to FIG. 13.

The reference numbers of any parts in FIG. 15 which correspond to those in FIGS. 2 and 5 have been increased by 100. As far as details are concerned, the attachable housing 101 is provided with fixing flanges 125 with screw holes 124, with the plug insert 102 being inserted into said housing. The first part 104 of the plug insert 102 is inserted into the through-aperture 103 of the attachable housing 101 and projects from the lower end thereof. The width of the upper second part 105 does not exceed the cross-section of the through-aperture 103. In the through-aperture 103 of the attachable housing 101, fixing flanges screwed to the plug insert are screwed by means of screws 127 to the bases 138 in the through-aperture 103. The end faces of the plug insert 102 are fixed to plate metal parts forming a clip 128 which are provided with a holding plate 130 and a clamping screw 131; earthing or protective contact wires may be clamped to said clip.

Figure 16:
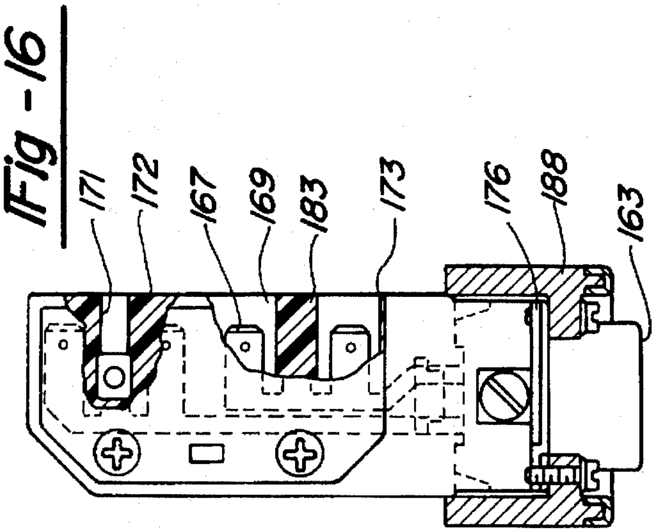
FIG. 16 is a vertical section of a fourth embodiment of a plug insert in accordance with the invention, fitted in an attachable housing.

The reference numbers of any details in FIG. 16 which correspond to those of FIG. 7 have been increased by 100.

In FIG. 16, the plug insert 152 is inserted into a conventional attachable housing 151. The plug insert 152 comprises screwed-on fixing flanges 176 which rest on bases 188 in the attachable housing 151 and are connected thereto by screws 177. In this case, the bases 188 do not comprise threaded holes, but through-holes, whereas the screwed-on fixing flanges 176 consist of a reinforced material and comprise threaded holes so that the threading process can take place from the plugging-in end. The plug insert 152 comprises a first part 154 inserted into the through-aperture 153 of the attachable housing 151, and a second part 155 positioned outside the attachable housing 151 and not projecting beyond the open cross-section of same. The first part 154 passes into the second part 155 so as to be integral therewith. The plug insert 152 is provided with longitudinal recesses accommodating conductor rails 161. Plug-in contacts (not illustrated) are slid on to said conductor rails and crimped on for example. The conductor rails 161 pass into the connecting contacts 167, 167' so as to be integral therewith. Furthermore, they comprise central contact tongues 183. The conductor rails 161 are punched out of plate metal material. The connecting contacts 167, 167' end in open plug-in aperture 169, 169'. The contact tongues 183 are positioned in the region of the plug-in apertures 171 provided for contact bridges to be illustrated at a later stage. The plug insert 152 comprises longitudinal bores 198 which are provided for passing through screws or rivets 199 for connecting a plurality of disc-shaped parts of the plug insert. The type of plug insert shown here comprises a first connecting face 163 with apertures for the contact inserts and two second connecting face parts 172, 173 which are co-planar and symmetrical relative to one another, with plug-in apertures 169 for connecting contacts, with the connecting face 163 and the connecting faces 172, 173 forming an angle of 90° relative to one another.

Figure 17:
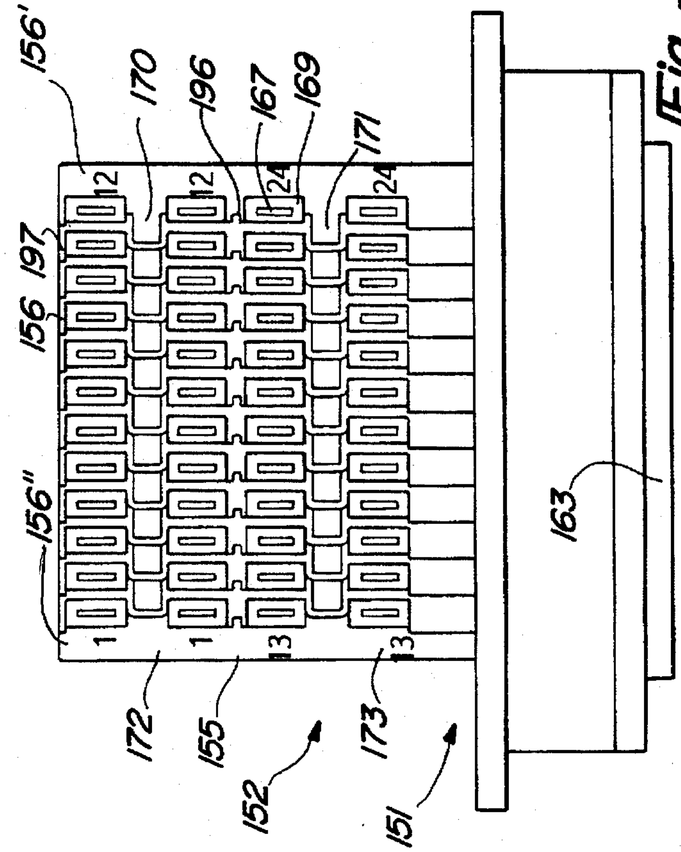
FIG. 17 is a side view of a plug insert with an attachable housing according to FIG. 16, with a plan view of the second connecting faces.

In FIG. 17, the reference numbers of any details corresponding to those in FIG. 8 have been increased by 100. The plug insert 152 is shown in a side view, with the attachable housing 151 containing the plug insert 152 being visible as well. The ends of the attachable housing 151 are provided with flanges 175 by means of which it is possible to screw the attachable housing 151 into a switch cabinet housing or the like. FIG. 17 shows that the plug insert is composed of first end disc members 156', 156" and of further disc members 156 which are identical relative to one another. It is not incompatible with the designation "disc member" that in the end faces, springs and grooves 196, 197 engage one another. Between the disc members there are provided the plug-in apertures 169, 169' in which the connecting contacts 167, 167' provided in the form of tongue-shaped plate metal parts are freely positioned. Commercial flat plugs may be slipped on to said connecting contacts. Between the disc members there are arranged the plug-in apertures 171 which are offset relative to the plug-in apertures 169, with the contact tongues 183 projecting into the ends of the plug-in apertures 171. When a contact bridge is inserted into one of said apertures 171, adjoining pairs of connecting contacts 167, 167' are conductingly connected to one another in that a conducting contact is produced between the respective contact tongues 183, for instance the connecting contacts 1—1 are connected to the connecting contacts 2—2 positioned parallel relative thereto.

Figure 18:
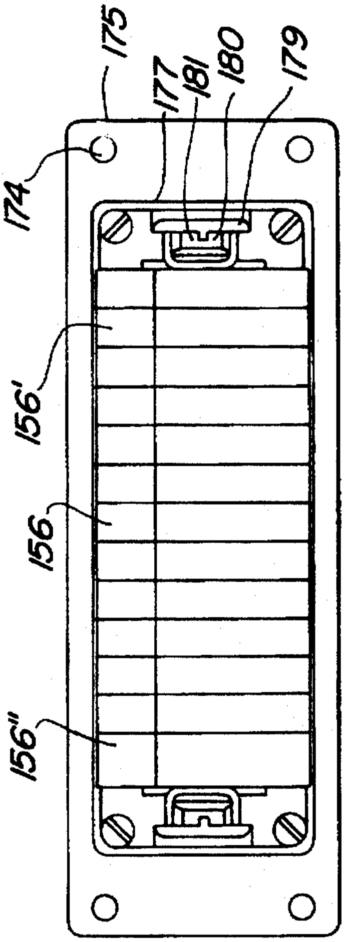
FIG. 18 is a plan view of a plug insert with an attachable housing according to FIG. 16.

In FIG. 18, the plug insert 152 is fitted into the attachable housing 151, with the first part 155 which projects from the upper end of the through-aperture not being wider than the cross-section of the through-aperture. In the through-aperture 153 of the attachable housing 151, screwed-on fixing flanges 176 of the plug insert 152 are screwed by means of screws 177 to the above-mentioned bases 188 of the attachable housing. The end faces of the plug insert 152 are provided with plate metal clips 79 against which it is possible to press a holding plate 180 by means of a screw 181; earthing or protective contact wires may be clamped on between said parts. It is indicated that the plug insert 152 consists entirely of disc members 156 which are identical relative to one another and of end disc members 156', 156" which comprise the entire height of the first and second parts. On the other hand, the contact insert for contact pins or contact bushes which projects from the lower end of the through-aperture consists of one piece.

Figure 19B:
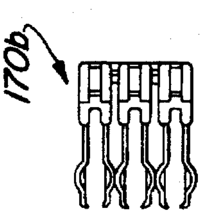
FIG. 19 shows two embodiments of the contact bridges a) in the form of a section and side view b) in the form of a section through three integrated contact bridges.
Figure 19A:
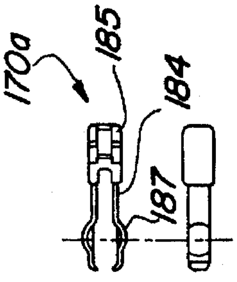

FIG. 19*a* shows a section and a side view of a contact bridge 170 comprising a non-conducting gripping part 185 and two resilient conductor arms 184 which are conductingly connected to one another in a U-shaped way and cast into the gripping part 185. The conductor arms 184 comprise pressed-out portions 187 whose engaging function has already been explained.

FIG. 19*b* shows a modified contact bridge 170' which, in one single gripping part 185, accommodates three pairs of conductor arms 184 which are each connected to one another in a U-shaped way. In this way it is possible to establish conducting connections between four pairs of connecting contacts at the same time.

Figure 20A:
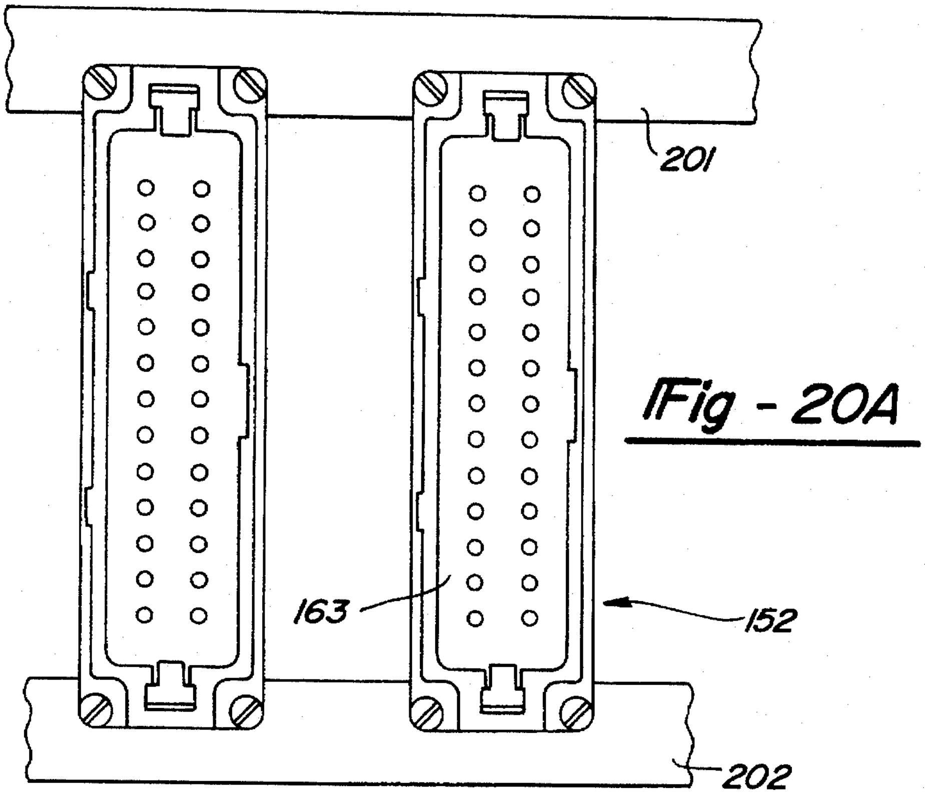
FIG. 20 shows plug inserts in accordance with the invention, fitted on parallel rails a) in a plan view b) in a side view.

FIG. 20*a* shows how two parallel plug inserts 152 are screwed on to parallel carrier rails 201. 202; it also shows the connecting faces 163 of the plugs.

Figure 20B:
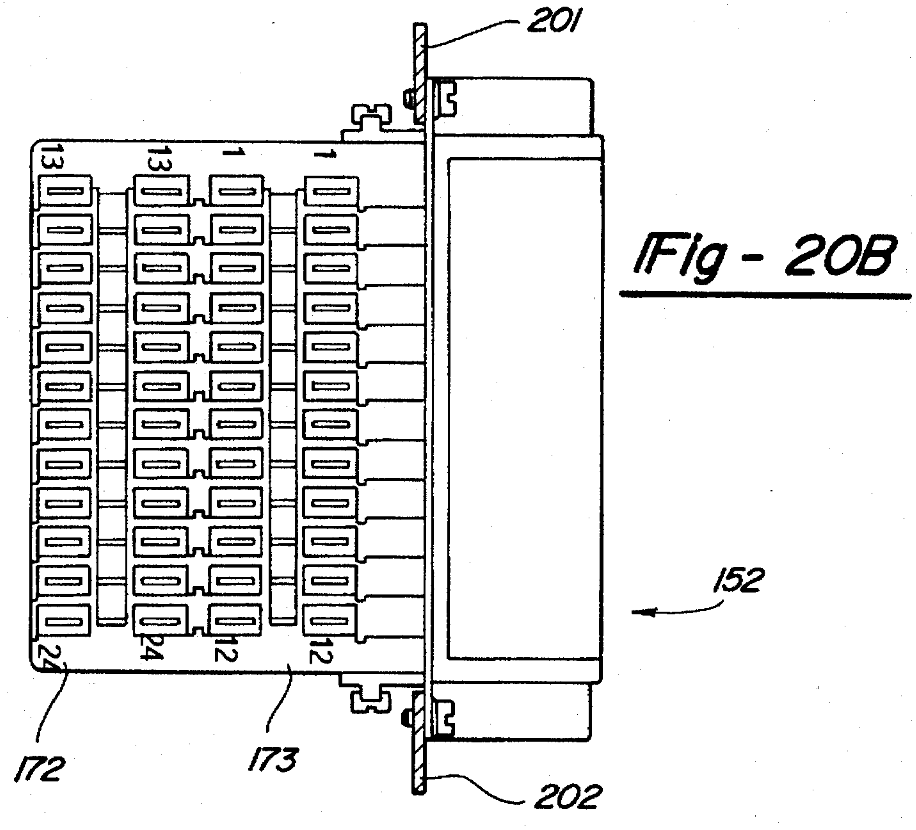

FIG. 20*b* shows the same details as FIG. 20*a* in a cross-section through the carrier rails 201, 202; the co-planar connecting face parts 172, 173 passing into one another are also shown.

Figure 21A:
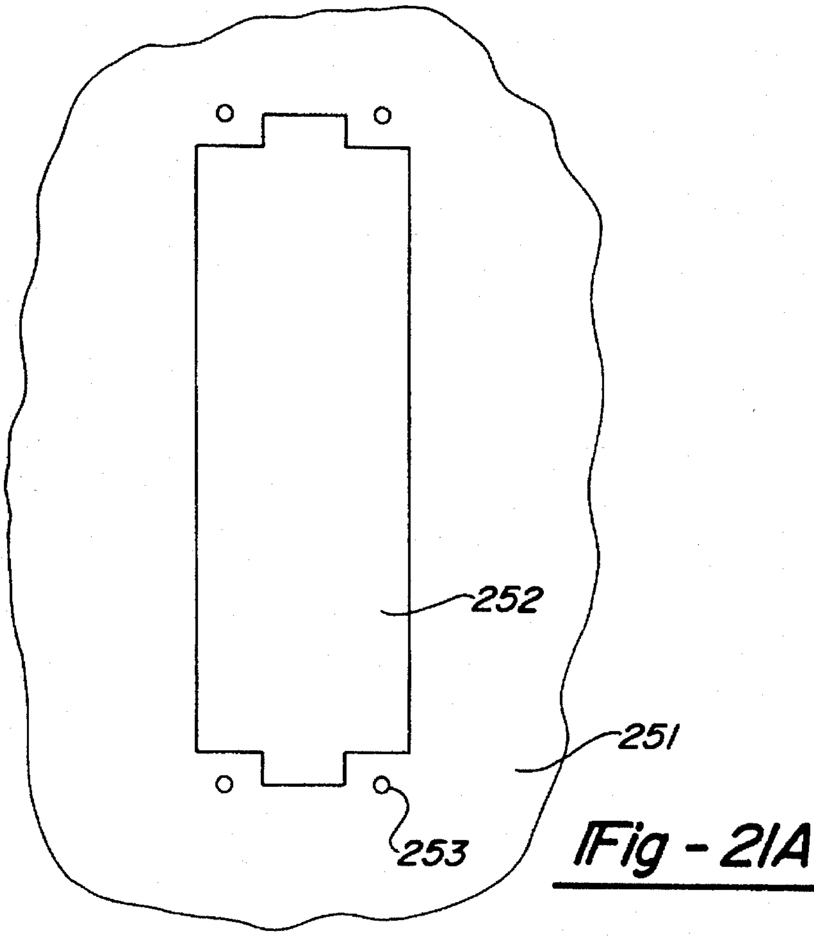
FIG. 21 shows a possibility of assembling plug inserts in accordance with the invention a) a prepared cut-out assembly region in a plate metal wall b) a vertical section of a fitted plug.
Figure 21B:
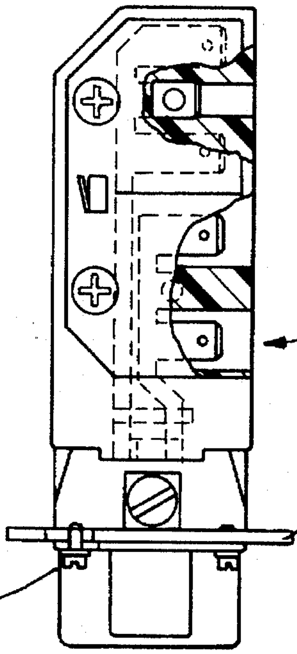

FIG. 21*a* illustrates a plate metal wall part 251 with a cut-out hole 252 and threaded holes 253 for inserting and screwing in a plug insert.

FIG. 21*a* is a vertical section through a plug insert 152 which is inserted into a plate metal wall part 251 and secured by screws 254.

Figure 22:
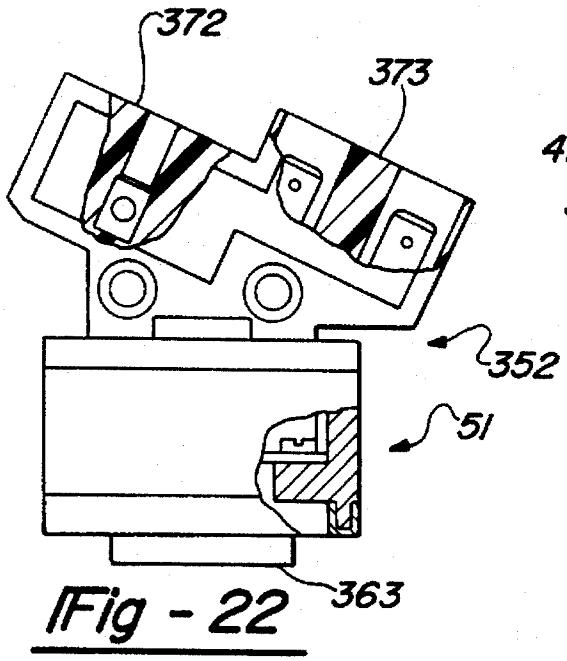
FIG. 22 is a side view of a fifth embodiment and partial sections of a plug insert in accordance with the invention, fitted in an attachable housing, with two connecting faces offset in parallel relative to one another.

FIG. 22 shows a plug insert 352 and an attachable housing 51 designed similarly to that shown in FIG. 7. However, the second connecting faces 372, 373 are inclined at an angle relative to the first connecting face 363 and offset in parallel relative to one another.

Figure 23:
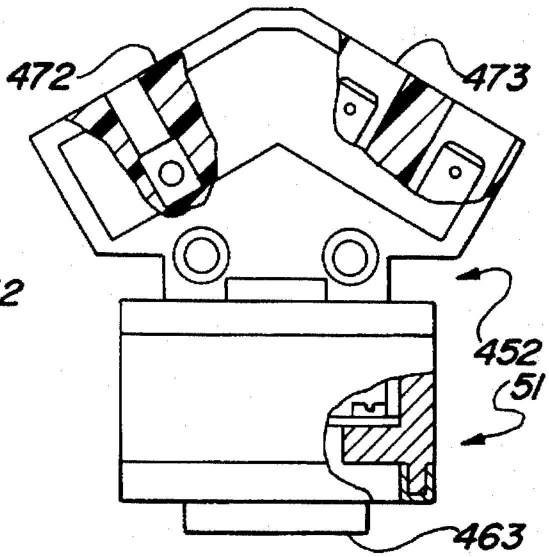

FIG. 23 shows a plug insert 452 and an attachable housing 51 designed similarly to that shown in FIG. 7. However, the second connecting faces 472, 473 are symmetrically inclined, each by the same angle, relative to the first connecting face 463, so that they are positioned roof-like relative to one another.

Figure 24:
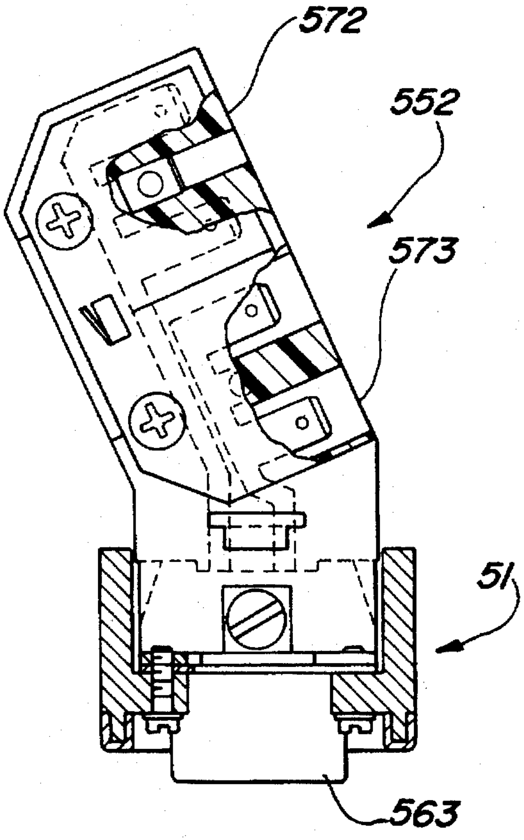
FIG. 24 shows a side view and partial sections of a seventh embodiment of a plug insert in accordance with the invention, fitted in an attachable housing, with co-planar connecting faces positioned at an angle relative to the first connecting face.

FIG. 24 shows a plug insert 552 in an attachable housing 51 designed similarly to that shown in FIG. 16. The second connecting faces 572, 573 are co-planar and inclined relative to the first connecting face 563 by an angle deviating from 90°.

Figure 25:
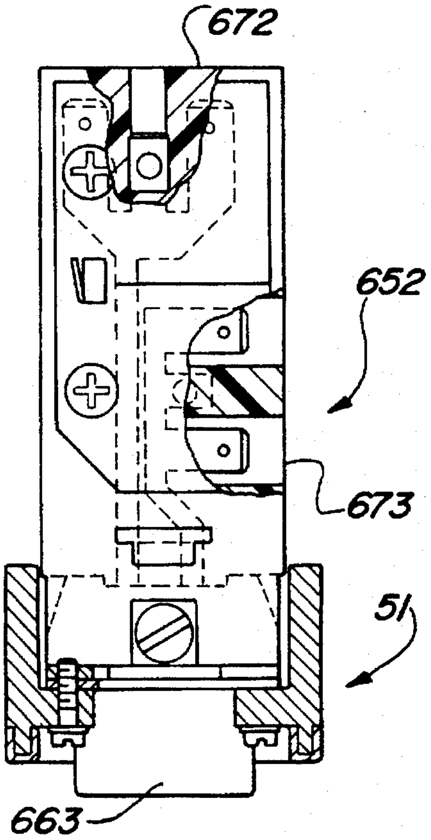
FIG. 25 shows a side view and partial sections of an eighth embodiment of a plug insert in accordance with the invention, fitted in an attachable housing, with connecting faces pointing asymmetrically in different directions relative to the first connecting face.
Figure 3:
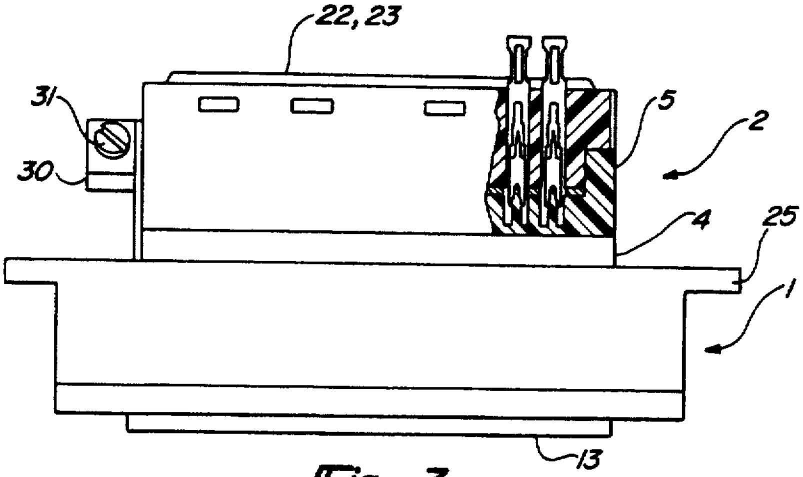
Figure 4:
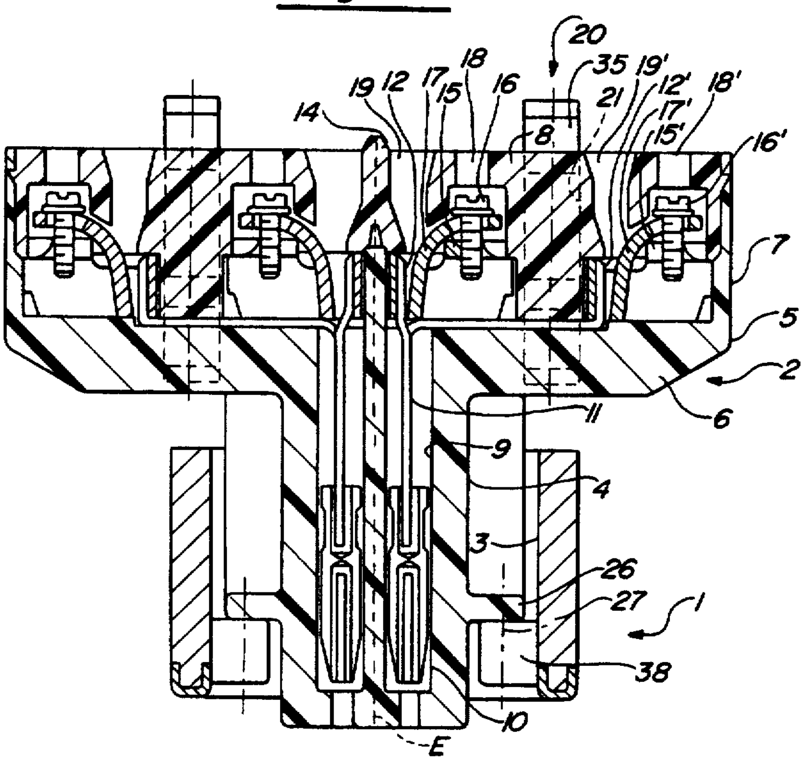

FIG. 25 shows a plug insert 652 and an attachable housing 51 designed similarly to that shown in FIG. 16. One of the two second connecting faces 672 is arranged opposite the first connecting face 663 whereas the second connecting face 673 forms an angle of 90° relative to the first connecting face 663.

I claim:

1. A multi-pole plug insert comprising:

an insulative housing including a first part of said housing provided with a first number of electrical contact inserts;

a second part of said housing provided with a second multiple number of electrical connecting contacts relative to the first number, and adjoining sets of said second multiple number of electrical connecting contacts being separated from one another by insulative material of said housing second part, with each electrical contact insert in the first part being permanently conductingly connected to said multiple number of electrical connecting contacts in the second part and the second part including at least one aperture in the insulative material between each two adjoining sets of multiple members of electrical connecting contacts, each of which is permanently conductingly connected to a contact insert in the first part, said at least one aperture adapted to clamp a contact bridge which establishes a conducting connection between the two adjoining sets of multiple numbers of electrical connecting contacts with all electrical connecting contacts remaining accessible.

2. A plug insert according to claim 1 wherein the first part accommodates two parallel rows of contact inserts and wherein the second part includes four parallel rows of the same number of electrical connecting contacts.

3. A plug insert according to claim 1, wherein the second part includes two non-conducting individual parts between which there are held conductor elements for connecting the electrical contact inserts to the electrical connecting contacts.

4. A plug insert according to claim 1, wherein the plug-in contacts are provided in the form of contact pins or contact terminals.

5. A plug insert according to claim 1, wherein the electrical connecting contacts are provided in the form of spring terminals or screw-type terminals.

6. A plug insert according to claim 1, wherein fixing flanges of the plug insert, especially fixing flanges bolted thereto rest on the reverse side of bases in the attachable housing, if viewed in the direction of a first connecting face of the first part provided with the apertures for the plug-in contacts.

7. A plug insert according to claim 1, wherein fixing flanges of the plug insert, especially fixing flanges bolted thereto rest on the front face of bases set back in the attachable housing, if viewed in the direction of a first connecting face of the first part provided with the apertures for the plug-in contacts.

8. A plug insert according to claim 1, wherein the fixing flanges include through-holes and wherein the bases include threaded holes.

9. A plug insert according to claim 1, wherein the bases include through-holes and wherein the fixing flanges are reinforced and include threaded holes.

10. A plug insert according to claim 1, wherein the first part and the second part of the plug insert have substantially the same lengths.

11. A plug insert according to claim 10, wherein a tongue for crimping on a contact insert is connected so as to be integral with said multiple number of associated electrical connecting contacts.

12. A plug insert according to claim 1, wherein the first part and the second part include a plurality of jointly shaped disc members between which there are electrical contact inserts and electrical connecting contacts conductingly connected to one another.

13. A plug insert according to claim 12, wherein the electrical connecting contacts are provided in the form of plate metal parts.

14. A plug insert according to claim 1, wherein a second connecting face of the second part in a plan view in plugging-in direction projects from the cross-section of the first part in a way so as to extend perpendicularly relative to the plugging-in direction.

15. A plug insert according to claim 14 for being fitted in a plug housing including a through-aperture for accommodating the plug insert and a flange face for fixing the plug housing to a base plate or to a wall of a switch cabinet housing, wherein the first part is insertable into the inner cross-section of the through-aperture and wherein the second part adjoins the first part outside the through-aperture and projects beyond the through-aperture.

16. A plug insert according to claim 14, wherein a first connecting face provided with plug-in apertures for the contact inserts and second connecting faces provided with plug-in apertures for the connecting contacts extend parallel relative to one another and point in opposite directions.

17. A plug insert according to claim 16, wherein the second connecting faces are coplanar.

18. A plug insert according to claim 14, wherein the first contact face provided with plug-in apertures for the contact inserts and the second connecting faces provided with plug-in apertures for the connecting contacts jointly form an angle.

19. A plug insert according to claim 18, wherein the second connecting faces are offset in parallel relative to one another.

20. A plug insert according to claim 18, wherein the second contacting faces are symmetrically inclined at a desired angle relative to the first connecting face.

21. A plug insert according to claim 1, wherein a first connecting face of the first part provided with the apertures for the plug-in contacts forms an angle with a second connecting faces provided with the connecting apertures for the electrical connecting contacts.

22. A plug insert according to claim 21, wherein the first connecting face and the second connecting faces, together, form an angle of 90°, with the second connecting faces being coplanar relative to one another.

23. A plug insert according to claim 21, wherein the first connecting face and the second connecting faces form an angle with respect to one another, said angle being in a range from about 90° to about 180°.

* * * * *

UNITED STATES PATENT AND TRADEMARK OFFICE

CERTIFICATE OF CORRECTION

PATENT NO. : 5,611,710
DATED : March 18, 1997
INVENTOR(S) : Wolfgang Essrich

It is certified that error appears in the above-identified patent and that said Letters Patent is hereby corrected as shown below:

Drawings:

Delete Drawing sheets 3-6, and substitute therefor the Drawing sheets, consisting of Figs. 3-6 as shown on the attached page.

Signed and Sealed this

Twenty-second Day of July, 1997

*Attest:*

BRUCE LEHMAN

*Attesting Officer*

*Commissioner of Patents and Trademarks*